… … …

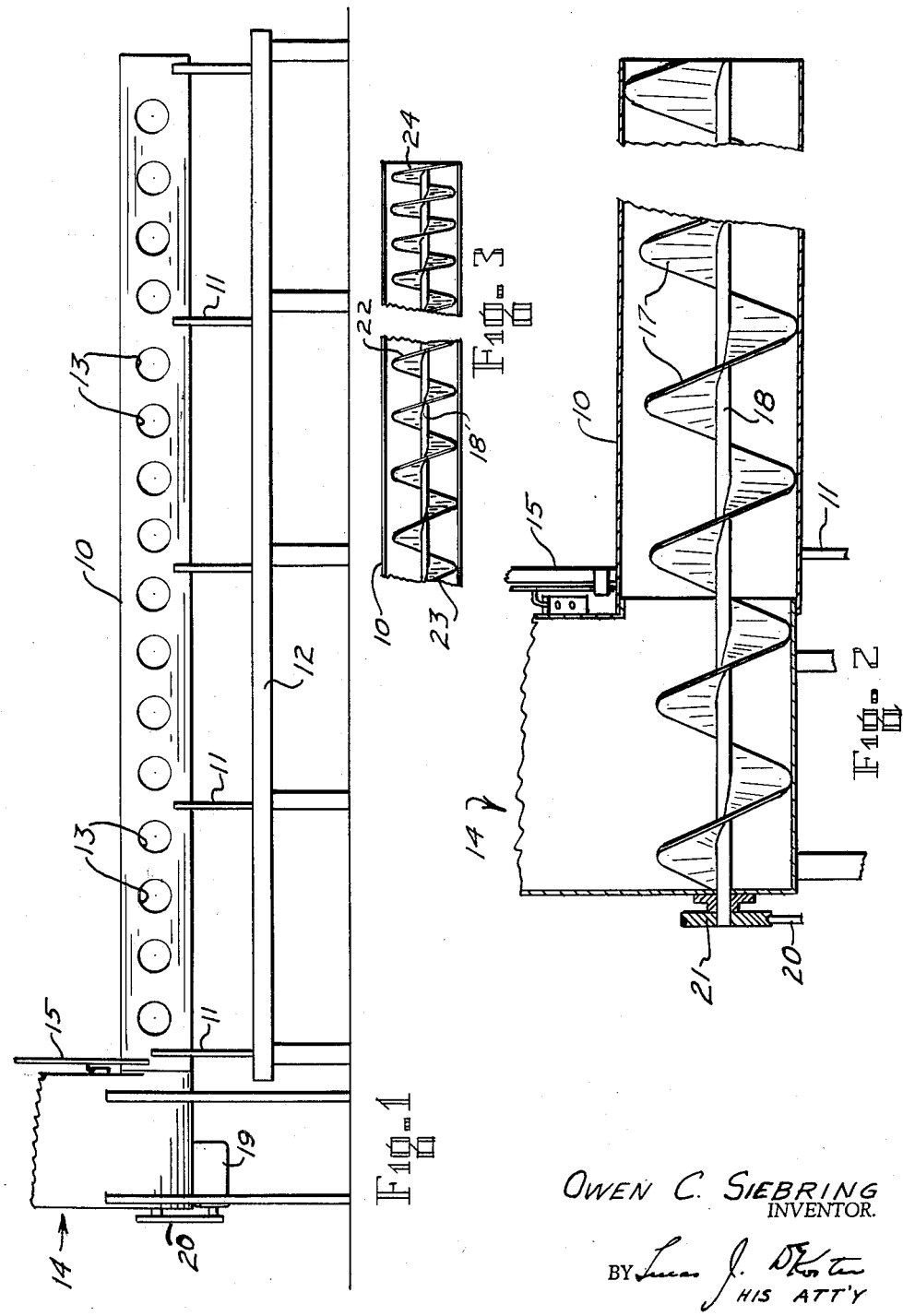

United States Patent Office 3,031,063
Patented Apr. 24, 1962

3,031,063
BUNK FEEDER HAVING A VARIABLE
FEED-RATE AUGER
Owen C. Siebring, George, Iowa
Filed Sept. 14, 1959, Ser. No. 839,795
9 Claims. (Cl. 198—64)

This invention pertains to devices for transporting livestock feed from a hopper and depositing it on a feed bunk, and more particularly to such a device having openings arranged on a horizontal line in a tube having a variable feed-rate auger.

Tubular type auger feed conveyors for dropping livestock feed onto feed bunks are well known. In order to operate effectively, these feeders have used various means to assure even distribution of feed along the length of the feeder. One of these means is a tube having successively dropped holes along the length thereof. Another utilizes a tube having successively larger openings as shown in the co-pending application of Claude Siebring, Serial No. 759,492.

I have determined that excellent results in this regard may be had by the use of a tube enclosing a variable feed-rate auger flighting but using uniform openings. This makes possible the economy of manufacture of single-sized openings, all in a horizontal line which is not possible with the other devices. Two different means for varying the feed rate may be used. One is to taper the diameter of the auger. The other is to change the lead thereof.

A more complete understanding of my invention may be had by a study of the following specification and the drawings in which:

FIG. 1 is a partial side elevational view of the device of my invention.

FIG. 2 is a fractional vertical medial sectional view of the device to an enlarged scale showing the tapered flighting exaggerated for purposes of illustration.

FIG. 3 is a partial vertical medial sectional view of my alternative device showing the change in lead of the flighting somewhat exaggerated for illustrative purposes.

Briefly my invention comprises a tubular cattle feeder having an adjustable tube enclosing a tapered auger which moves feed along the tube and drops it from openings in the side of the tube.

More specifically, and referring to the drawings, my device comprises a tube 10 which is in reality a feed carrying device. This tube is mounted on supports having yokes 11 in which the tube is rotatable. The exact structure at this point is conventional, and is shown in more detail in the aforementioned co-pending application.

Beneath the tube 10 is a conventional feed bunk or bunks 12 which catch the feed as it is distributed from the tube. Openings 13 are provided in the side of the tube. These openings should be aligned along a horizontal line on the side of the tube, and may all be of the same size. This arrangement is contrary in one or both respects to the formation of such holes in prior feeders. From these openings the feed drops onto the bunk 12.

A hopper 14 is mounted at the one end of the tube in a conventional manner, and the tube 10 is rotatable relative to the hopper. A control lever 15 is mounted on the tube so that the tube may be adjusted to allow the openings to be turned straight down to protect the device from the weather, or may be otherwise adjusted to provide proper feeding.

In my preferred embodiment, a tapered auger composed of tapered spiral flighting 17 and a shaft 18 is disposed within the tube 10 and extends into the hopper 14. The taper is disposed so that the smaller end is within the hopper. This auger is driven from the hopper end by a motor 19 through a belt 20 driving a pulley 21 on the end of the shaft 18. Thus feed dumped into the hopper will be picked up by the auger and delivered through the tube in a manner well known in the art. However where formerly it was necessary to drop the holes or enlarge them along the length of the tube in order to achieve even distribution, my expedient of using the tapered auger accomplishes the same results. This is true because the larger the diameter of the auger is, the more sweep it has and therefore the more material it will carry, and the more efficient it will be because it more nearly fills the tube. Thus the feed will be piled up higher in the tube and run out of the openings faster. Also, at its smaller end, the auger must lift the feed higher in comparison to its own diameter than at its larger end, and therefore, the feed will be lifted nearer the openings more readily by the larger diameter auger.

My alternative device is best shown in FIG. 3. The principle of operation is substantially the same as that for the tapered auger in that the lesser amount of feed is piled higher at the end of the tube 10 remote from the hopper. In my alternative device this is accomplished by reducing the lead of the helix formed by the flighting progressively away from the hopper. Thus in my alternative embodiment the flighting 22 which is mounted on the shaft 18' has a longer lead at the end 23 nearer the hopper, and a shorter lead at the end 24 remote from the hopper. Thus the feed will tend to pile up between the turns of the flighting at the more remote end 24 and thus be in a position to be pushed from the openings in the tube 10.

Thus it is apparent that by my invention I have provided a device of relatively simple construction which is able to accomplish the same end as prior bunk feeders, but without some of the more expensive manufacturing requirements.

Having thus described my invention two embodiments thereof, I am aware that numerous and extensive departures may be made therefrom without departing from the spirit or scope of my invention as limited only by the following claims.

I claim:

1. A feeding device comprising a hopper, an elongated feed carrying means connected to said hopper so that feed may be transported from said hopper into said feed carrying means, said feed carrying means having openings in the side thereof, and driven feed delivery means in said feed carrying means and passing adjacent to said openings and in said hopper; said feed delivery means being adapted to deliver feed from said hopper through said carrying means and outward through said openings, said delivery means being formed with at least one dimension varying progressively along the length of said delivery means whereby the feed is raised to the level of the openings substantially uniformly along said feed carrying means.

2. A feeding device comprising a hopper, an elongated feed carrying means connected to said hopper so that feed may be transported from said hopper into said feed carrying means, said feed carrying means having openings in the side thereof, said openings being arranged along a horizontal line, and driven feed delivery means in said feed carrying means and passing adjacent to said openings and in said hopper said feed delivery means being adapted to deliver feed from said hopper through said carrying means and outward through said openings, said delivery means being formed with at least one dimension varying progressively along the length of said delivery means whereby the feed is raised to the level of the openings substantially uniformly along the length of said feed carrying means.

3. The device of claim 1 in which the feed delivery means is an auger device having diameters varied from a smaller diameter adjacent said hopper to a larger diameter remote from said hopper.

4. The device of claim 3 in which the tube is movably connected to said hopper so that said tube may be rotated relative to said hopper.

5. The device of claim 4 in which control means is fixed to said tubular device to controllably adjust said tubular device relative to said hopper.

6. The device of claim 2 in which the elongated feed carrying means is a tube, said tube being mounted for rotation on its axis relative to said hopper and control means on said tube adapted to adjustably control the rotative position of said tube relative to said hopper, and said carrying means is an auger varied from a smaller diameter adjacent said hopper to a larger diameter remote from said hopper.

7. A feeding device comprising a hopper, an elongated feed carrying means connected to said hopper so that feed may be transported from said hopper into said feed carrying means, said feed carrying means having openings in the side thereof and driven feed delivery means in said feed carrying means and passing adjacent to said openings and extending into said hopper adapted to deliver feed from said hopper through said carrying means and outward through said openings, said delivery means being formed with at least one dimension varying progressively along the length of said delivery means whereby said delivery means has a variable feed rate such that the feed will be raised to the level of said openings substantially uniformly along the length of said feed carrying means.

8. The device of claim 7 in which the feed delivery means is an auger having a variable lead distance between flights.

9. The device of claim 8 in which the lead distance of the flighting varies from a greater distance near the hopper to a lesser distance remote from said hopper.

References Cited in the file of this patent

UNITED STATES PATENTS

| | | |
|---|---|---|
| 2,507,245 | Dady | May 9, 1950 |
| 2,745,381 | Wallace et al. | May 15, 1956 |
| 2,867,314 | Hansen | Jan. 6, 1959 |